United States Patent Office 3,647,876
Patented Mar. 7, 1972

3,647,876
PROCESS IN THE PREPARATION OF N,N-DI-n-PROPYL-α-CHLOROACETAMIDE
Mearl A. Kise, Portsmouth, and Leonard C. Ellis, Chesapeake, Va., assignors to Virginia Chemicals, Inc., Portsmouth, Va.
No Drawing. Filed Aug. 14, 1969, Ser. No. 850,250
Int. Cl. C07c 103/10
U.S. Cl. 260—561 HL                                        10 Claims

ABSTRACT OF THE DISCLOSURE

This is a process for the preparation of N,N-di-n-propyl-α-chloroacetamide at prevailing natural temperatures, as for example, at 20–30° C. exclusive of an excess of di-n-propylamine. The product is useful as an intermediate for the production of the so-called "space repellents," N,N-di-n-propyl-2-[(p-methoxybenzyl)oxy]-acetamide, N,N - di-n-propyl-2-(benzyloxy)-acetamide and N,N-di-n-propyl-2[(2methylcyclohexyl)oxy]-acetamide. By this process, α-chloroacetyl chloride and di-n-propylamine are reacted in the presence of aqueous caustic soda (heterogeneous system) at 20–30° C., the reaction being effected in toluene, using a 15% excess of α-chloroacetyl chloride which is added dropwise into the reaction media. Free caustic soda is excluded from the reaction media during addition of the acid chloride until a substantial portion of the α-chloroacetyl chloride has been introduced and allowed sufficient time for reaction. Economically, the process is desirable because the reaction environment need not be so closely controlled at low temperature, and secondly, there is a substantial saving in the quantity of the amine required to effect a satisfactory reaction.

SUMMARY OF THE INVENTION

α-chloroacetyl chloride and di-n-propylamine are reacted in the presence of aqueous caustic soda (heterogeneous system) at 20–30° C., the reaction being effected in a solvent such as toluene, preferably using a 15% excess of α-chloroacetyl chloride which is added dropwise into the reaction media. Significant is the fact that free caustic soda is never present in the reaction media during addition of the acid chloride until 76–88% of the α-chloroacetyl chloride has been introduced and allowed sufficient time for reaction. The aqueous caustic soda is added portionwise during cessation periods in the acid chloride addition, and in practice, a short period is observed after each caustic additon to ensure reaction before the acid chloride addition is resume. The caustic soda is consumed by the amine salt herein, forming sodium chloride and thereby liberating di-n-propylamine for reaction with acid chloride.

BACKGROUND OF THE INVENTION

"Space repellents" are insect repellents which are effective at a distance from the point of application. A chemical's effectiveness as a space repellent is measured as the number of days the chemical prevents more than 10% of the test mosquitoes, Aedes aegypti, from passing through the holes of large mesh (¼ inch) netting to reach a human arm. In the art, the three repellents previously mentioned as being derived from N,N-di-n-propyl-α-cloroacetamide were effective for a period of 90–266 days with N,N-di-n-propyl-2-[(p-methoxybenzyl)oxy] - acetamide being three times more effective than the other two.

Several methods are known for producing N,N-di-n-propyl-α-chloroacetamide and other related N,N-dialkyl-α-chloroacetamides.

By one method, various ratios of amine and α-chloroacetyl chloride are reacted in a solvent, (e.g., toluene) at temperatures of −30° to −20° C. (2, 3). The corresponding amine hydrochloride salt which is produced settles out and must be removed by filtration. Also, the yields are decreased, unless a large excess of amine is employed, thereby necessitating a recovery step for the amine and a subsequent loss in production time.

Another method conceived by A. J. Speziale and P. C. Hamm, J. Am. Chem. Soc., 78, 2556–9 (1956) requires extremely low temperatures, as for example, the range of −15 to 10° C with excess amine as the base. In the present process, sufficient caustic soda, added as a 20–25% solution, is present to continually liberate the amine from its salt as formed. This eliminates the need for excess amine. However, if one attempts the normal reaction at a more practical temperature (i.e., 20° C.), under the prior art conditions, considerable losses occur due to reaction of the α-chloroacetyl chloride with the caustic soda to form undesirable by-products.

The known prior art, exclusive of the process of Speziale and Hamm is as follows:

T. P. McGovern, M. Beroza and H. Gouck, J. Econ. Entomol., 60, 1591–1594 (1967)
N. Salomon, Israeli 10,062 (1957)
W. F. Bruce and R. S. Hanslick, U.S. 2,844,629 (1958)

DESCRIPTION OF THE PREFERRED EMBODIMENTS

From the summary aforesaid, it will be noted that α-chloroacetyl chloride and di-n-propylamine are reacted in the presence of aqueous caustic soda (heterogeneous system) at 20–30° C. The reaction is effected in a solvent, preferably toluene, using a 15% excess of α-chloroacetyl chloride, which is added dropwise into the reaction media. Free caustic soda is never present in the reaction media until 76–88% of the α-chloroacetyl chloride has been introduced and allowed sufficient time for reaction. Moreover, as indicated, the caustic soda is not added until there occurs a cessation period in the acid chloride addition, and the acid chloride addition is not resumed until sufficient time has past to allow for complete reaction of the caustic soda. The caustic soda is consumed by the amine salt, forming sodium chloride and liberating fresh di-n-propylamine for reaction with the acid chloride.

By this process, N,N-di-n-propyl-α-chloroacetamide can be prepared in yields exceeding 85% through reaction as aforesaid, provided the conditions are modified to prevent reaction between caustic soda and α-chloroacetyl chloride. The di-n-propylamine is replenished through liberation from its salt, thereby precluding the prior requirement for excess di-n-propylamine, and eliminating a loss of production time for amine recovery. In effect, the essence of invention herein resides in modifying the conditions of reaction to prevent reaction between the α-chloroacetyl chloride and caustic soda, per se, permitting thereby the reaction temperature to be raised to 20–30° C. without a loss in yield. Viscosity is kept low because the amine hydrochloride is solubilized by the water present.

Other satisfactory condition extremes are listed as follows:

(A) The reaction temperature range may be extended from 0° to 50° C.
(B) The quantities of α-chloroacetyl chloride may vary from 0% to 30% excess.
(C) Caustic strength may be varied from 5% to 50%.
(D) Other suitable solvents herein include benzene, toluene, xylene and hexane.

EXAMPLE I (A) A reactor was charged with 375 ml. of toluene and 101.2 g. (1.0 mole) of di-n-propylamine and then cooled to 15–20° C.

(B) Addition of 130.0 g. (1.15 moles) of α-chloroacetyl chloride was started at a feedrate of approximately 1.4 g. per minute, while moderately agitating the reaction media and controlling the temperature below 31° C. The mixture became viscous after adding 35% of the α-chloroacetyl chloride (0.41 mole). At this point, the addition was halted and the reactants allowed to further react for 10 minutes. Afterwards, 50.0 g. of 25% caustic soda (0.31 mole) was charged, liberating amine from its salt and significantly decreasing the viscosity of the reaction media. Again, a 10 minute reaction period was observed to allow complete reaction before introducing additional α-chloroacetyl chloride.

(C) The alternating procedure for adding α-chloroacetyl chloride and 25% aqueous caustic soda was continued with interruptions of the acid chloride addition at 56% and 75% of the total charge. The percentages of caustic soda added at each of these points were 37% and 95% with the remaining 5% being added after completion of the acid chloride addition. At this point the reaction crude was alkaline.

(D) Sufficient water was then added to yield a 22.5% sodium chloride solution, assuming theoretical yield.

(E) The bottom, aqueous layer was drained to waste. The organic product layer was dried azeotropically, and then partially distilled to remove the toluene from the crude product.

(F) When necessary, the crude product was fractioned in vacuo using a Vigreaux column. Stainless steel packing was found to be detrimental to good distillation yields because of accelerated decomposition to N,N-dipropylacetamide.

(G) The crude product and distilled fractions were analyzed by vapor phase chromatography.

By way of further identity with the process conducted herein, reference is made to Table I, following:

We claim:
1. In the production of N,N-di-n-propyl-α-chloracetamide wherein an acetyl chloride and an amine are reacted in a solvent, an improvement process, conducted at natural temperatures comprising:
   (A) first charging a reactor with a hydrocarbon solvent and di-n-propylamine;
   (B) secondly initially adding a minor proportion of α-chloroacetyl chloride while moderately agitating this reaction media;
   (C) thirdly, arresting addition of α-chloroacetyl chloride for further reaction;
   (D) further, charging the reaction media with a minor portion of the aqueous caustic soda, during the arresting of the acetyl chloride addition, whereby amine is liberated from its salt;
   (E) sequentially adding additional α-chloroacetyl chloride in final excess relative to the amine and aqueous caustic soda alternately, periodically of the respective reactions thereof until the reaction is completed, whereby the resultant amine salt is consumed.

2. The process of claim 1 in which the α-chloroacetyl chloride is in excess of the reaction media by 0% to 30%.

3. The process of claim 2 in which the aqueous caustic soda is in solution not to exceed 5% to 50% in strength, and in which it is periodically added after a major portion of the chloride has been added.

4. The process of claim 2 wherein the α-chloroacetyl chloride is in excess of the reaction media by 15%.

5. The process of claim 3 wherein the α-chloroacetyl chloride is in excess of the reaction media by 15%.

6. The process of claim 3 in which the aqueous caustic soda is in solution not to exceed 25%.

7. The process of claim 2 in which the solvent is of the group comprising: benzene, hexane, toluene and xylene.

8. The process of claim 3 in which the solvent is of the group comprising benzene, hexane, toluene and xylene.

9. The process of claim 7 wherein the solvent is toluene, per se.

10. The process of claim 8 wherein the solvent is toluene, per se.

TABLE I

| Reaction Number | Toluene (ml.) | DPA[1] (moles) | CA chl.[2] (moles) | CA chl.[2] feed-rate (gr./min.) | Temperature, °C. | Time (hrs.) | Step-wise addition.[3] Total CA chl.[2] | Step-wise addition.[3] Moles NaOH | Percent yield (based on amine) Distillation | Percent yield (based on amine) Crude[4] |
|---|---|---|---|---|---|---|---|---|---|---|
| 746–13 | 375 | 1.0 | 1.15 | 1.4 | (−)11.5–3.0 | 2.22 | .41 / .65 / .87 / 1.15 | .31 / .50 / 1.30 / 1.38 | 83.8 | ([5]) |
| 746–17 | 375 | 1.0 | 1.15 | 1.4 | 15.5–28.0 | 2.34 | .41 / .65 / .87 / 1.15 | .31 / .50 / 1.30 / 1.36 | 71.8 | 89.7 |
| 746–22 | 750 | 2.0 | 2.30 | 3.0 | 18.5–31.0 | 4.18 | .83 / 1.40 / 1.75 / 2.04 / 2.30 | .61 / 1.00 / 2.30 / 2.53 / 2.75 | ([5]) | 86.7 |

[1] Di-n-propylamine.
[2] α-chloroacetyl chloride.
[3] The addition of α-chloroacetyl chloride was stopped at certain intervals. After a short reaction period a portion of caustic soda (25% solution) was added. Again a short reaction period was observed before addition of the acid chloride was resumed.
[4] Yield based on a gas chromatographic analysis.
[5] Not determined.

References Cited

UNITED STATES PATENTS 2,844,611  7/1958  Freudenberg _____ 260—404
3,223,700  12/1965  Klavehn et al. _____ 260—239.1

OTHER REFERENCES

Hamm et al.: Agriculture and Food Chemistry, vol. 4, No. 6, June 1956, pp. 518–522, page 518 pertinent.

LEWIS GOTTS, Primary Examiner

E. G. LOVE, Assistant Examiner